United States Patent
Richt et al.

(10) Patent No.: US 9,782,865 B2
(45) Date of Patent: Oct. 10, 2017

(54) POSITIONING AID FOR A CORE DRILLING MACHINE

(71) Applicant: C. & E. Fein GmbH, Schwaebisch Gmuend-Bargau (DE)

(72) Inventors: Boris Richt, Hemmingen (DE); Andreas Zerr, Berglen (DE)

(73) Assignee: C. & E. Fein GmbH (DE)

( * ) Notice: Subject to any disclaimer, the term of this patent is extended or adjusted under 35 U.S.C. 154(b) by 0 days.

(21) Appl. No.: 14/955,980

(22) Filed: Dec. 1, 2015

(65) Prior Publication Data

US 2016/0151873 A1    Jun. 2, 2016

(30) Foreign Application Priority Data

Dec. 1, 2014 (DE) .................. 10 2014 117 587

(51) Int. Cl.

| | |
|---|---|
| *B23B 49/00* | (2006.01) |
| *B23Q 17/24* | (2006.01) |
| *B25H 1/00* | (2006.01) |
| *G01C 15/00* | (2006.01) |
| *B23Q 15/22* | (2006.01) |
| *B23Q 3/18* | (2006.01) |
| *B23B 51/04* | (2006.01) |
| *B23Q 17/22* | (2006.01) |

(52) U.S. Cl.
CPC .......... *B23Q 17/2404* (2013.01); *B23B 49/00* (2013.01); *B25H 1/0092* (2013.01); *G01C 15/002* (2013.01); *B23B 51/0426* (2013.01); *B23B 2260/092* (2013.01); *B23Q 3/183* (2013.01); *B23Q 15/22* (2013.01); *B23Q 17/225* (2013.01); *Y10T 408/553* (2015.01)

(58) Field of Classification Search
CPC . Y10T 408/553; B23B 49/00; B23B 2270/12; B23B 51/0426; B23B 2260/092; B23B 2260/10; B25H 1/0078; B23Q 3/183; B23Q 15/20; B23Q 15/22; B23Q 17/12; B23Q 17/2233; B23Q 17/225; B25B 23/18; F21V 33/008; F21V 33/0084
USPC .............. 33/286, 638; 362/119, 249.02, 553
See application file for complete search history.

(56) References Cited

U.S. PATENT DOCUMENTS 3,550,229 A * 12/1970 Zenses ................ B23B 51/0406
 144/23
3,559,513 A * 2/1971 Hougen .............. B23B 51/0426
 407/1

(Continued)

FOREIGN PATENT DOCUMENTS

CN WO 2006119703 A2 * 11/2006 ............. B23B 49/00
DE 4435573 A1 4/1996

(Continued)

*Primary Examiner* — Daniel Howell
*Assistant Examiner* — Chwen-Wei Su
(74) *Attorney, Agent, or Firm* — St. Onge Steward Johnston & Reens, LLC

(57) ABSTRACT

A positioning aid is disclosed for a core drilling machine, having a core drill for creating a hollow-cylindrical drill hole. The positioning aid includes a light source for creating a centring pattern on a workpiece. The positioning aid is fastened in a releasable and centered manner to the core drilling machine. The positioning aid may include a laser pointer, which is releasably fastened to a centring pin.

23 Claims, 2 Drawing Sheets

(56) References Cited

U.S. PATENT DOCUMENTS

| | | | | |
|---|---|---|---|---|
| 3,825,362 A | * | 7/1974 | Hougen | B23B 51/044 |
| | | | | 408/204 |
| 3,919,541 A | * | 11/1975 | Chao | B25B 23/18 |
| | | | | 362/120 |
| 4,352,610 A | * | 10/1982 | Yankovoy | B23B 51/0426 |
| | | | | 408/1 R |
| 6,328,505 B1 | | 12/2001 | Gibble | |
| 8,360,597 B1 | * | 1/2013 | Hanchett | B25F 5/021 |
| | | | | 362/119 |
| 2006/0112581 A1 | * | 6/2006 | Nortmann | B23D 59/002 |
| | | | | 33/638 |
| 2007/0068020 A1 | | 3/2007 | Adrian | |
| 2014/0036482 A1 | * | 2/2014 | Vanko | B25F 5/021 |
| | | | | 362/119 |
| 2014/0227054 A1 | | 8/2014 | Timmons et al. | |
| 2015/0049467 A1 | * | 2/2015 | Thompson | B25B 23/18 |
| | | | | 362/120 |
| 2015/0321266 A1 | * | 11/2015 | Sattler | B23B 49/00 |
| | | | | 408/16 |

FOREIGN PATENT DOCUMENTS

| | | | | |
|---|---|---|---|---|
| DE | 202004005221 U1 | 7/2004 | | |
| DE | 102012221262 A1 | 5/2014 | | |
| JP | 2000354904 A | 12/2000 | | |
| WO | WO 2015065896 A1 | * | 5/2015 | B23B 47/26 |

* cited by examiner

POSITIONING AID FOR A CORE DRILLING MACHINE

CROSS REFERENCES TO RELATED APPLICATIONS

This claims priority from German patent application 102014117587.5, filed on Dec. 1, 2014. The entire content of this priority application is incorporated herein by reference.

BACKGROUND OF THE INVENTION

The invention relates to a positioning aid for a core drilling machine.

By a core drilling machine is understood, within the scope of this application, a drilling machine which in core drilling operation drills out only a hollow cylinder, whilst within the hollow cylinder the material is not cut, so that a core remains. Once the workpiece is fully drilled through, this core can be ejected or must be separated off in some other way. As a rule, core drilling machines are transportable. They are placed on the workpiece and fastened on the workpiece by means of a magnet in the drill stand or other suitable means (for example vacuum suction plate, fastening screws, etc.). Magnetic core drilling machines are also used for drilling with cylindrical solid drill bits, for countersinking and for reaming.

RELATED PRIOR ART

In order to position a core drilling machine on the position to be drilled, centring pins are commonly used. The respective centring pin can be releasably inserted into the chuck of the core drilling machine. In order now to arrive at an accurate drilling position, on the one hand the drill must be displaced on the surface of the workpiece, while on the other hand the height of the centring pin must be altered with the cross feed in order that, during the displacement along the material surface, it does not touch this. As a result, several positioning operations are generally necessary to position the core drill exactly over the drilling site. This is a complex process.

From US 2007/0068020 A1 a positioning aid for a drilling machine is known which includes a light source which is configured for releasable attachment to a drill chuck of the drilling machine.

SUMMARY OF THE INVENTION

In view of this it is an object of the invention is to disclose an improved positioning aid for a core drilling machine.

It is a further object of the invention to disclose a positioning aid for a core drilling machine that allows for a highly precise positioning of the core drilling machine.

It is a further object of the invention to disclose a core drilling machine comprising a positioning aid allowing for an easy handling when positioning the core drilling machine.

It is a further object of the invention to disclose a core drilling machine comprising a positioning aid allowing for an improved positioning of the core drilling machine on a workpiece.

According to one aspect of the invention a positioning aid for a core drilling machine with a core drill is disclosed for creating a hollow-cylindrical drill hole, comprising a light source for creating a centring pattern on a workpiece, said light source being configured for releasable, centred fastening to said core drill.

Through the use of a light source for creating a centring pattern on the workpiece, an accurate positioning is enabled without the need to alter for this purpose the distance of the drill chuck relative to the workpiece. The centring operation is made considerably easier.

According to a further aspect of the invention, the light source comprises a laser pointer for creating the centring pattern.

Since laser pointers are available at reasonable cost in great variety and in all possible versions, a highly precise, cost-effective centring option is herewith created.

According to a further aspect of the invention, the positioning aid is configured for fastening to a centring pin.

In this way, the centred receiving fixture of the centring pin, which receiving fixture is in any case provided on the core drill, is used to centre the positioning aid.

The positioning aid can here be permanently connected to the centring pin, so that the latter is directly insertable by the end of the centring pin into the core drill.

Alternatively, a releasable fastening of the positioning aid to the centring pin can also be provided.

Since commercially available centring pins generally have a standard diameter amounting, for example, to 6.35 mm, a commercially available laser pointer, which is releasably mountable onto the centring pin, can equally be used as the centring aid. Further common dimensions for centring pins are 11.11 mm (7/16 inch diameter) and 8.0 mm. For these too, there are commercially available laser pointers.

According to a further aspect of the invention, the positioning aid is configured to be automatically switched on when mounted onto the centring pin.

A simplified handling is hereby obtained.

According to a further aspect of the invention, the positioning aid has at one end a receiving fixture for fastening to a clamping chuck of the core drill.

The positioning aid can thus be clamped directly into the clamping chuck of the core drill, whereby increased precision is achieved. A certain drawback lies in the fact that the complexity is somewhat increased, since, after the correct positioning, the positioning aid must first be unclamped again, after which the tool must be clamped in place.

In a further aspect of the invention, the positioning aid has a light field for the lighting of a working area and a centring pattern for the centring.

The ease of use is hereby further increased.

Preferably the centring pattern here has a brighter illumination than the light field for the lighting. Thus the light field can firstly be used to acquire a rough positioning even under adverse lighting conditions, after which, once the work site is in the region of the light field, the centring pattern can be used for the exact positioning.

Preferably, the positioning aid has its own power source, for instance in the form of a battery or an accumulator.

As a result, a facilitated handling is obtained.

According to a further embodiment of the invention, the positioning aid has a fastening device, for instance in the form of a magnet, for securement to the core drilling machine when in use.

In this way, the positioning aid can be stowed on the core drilling machine as long as this is not being used. The positioning aid is thus ready to hand at all times whenever it is required.

According to a further embodiment of the invention, the positioning aid has a switching device for switching the light source on and off, preferably for separate switching of the centring pattern and of a light field.

In this way, the light source of the positioning aid can be switched on specifically when it is needed. Insofar as an additional (less strongly illuminated) light field is provided to light the work site, a separate circuit can if necessary be provided for this purpose.

According to a further embodiment of the invention, the centring pattern comprises at least one laser point, a reticle or a circle. Of course, a combination of these patterns can also be provided, or other patterns which appear suitable for the positioning can also be used.

In a core drilling machine comprising a positioning aid according to the invention, the positioning aid is releasably fastened, so that it can be removed prior to the start of the drilling operation.

Preferably the core drill has a mounting for receiving the positioning aid when this is not in use.

This mounting can here be in the form of a pocket, a magnet, a clampable mounting or similar, whereby a secure, easily releasable fastening is ensured during non-usage.

Obviously the features of the invention which have been stated above, and those which are yet to be described below, can be used not only in the respectively defined combination, but also in other combinations or in isolation, without departing from the scope of the invention.

BRIEF DESCRIPTION OF THE DRAWINGS

Further features and advantages of the invention emerge from the following description of preferred illustrative embodiments with reference to the drawing, wherein:

FIG. 4 shows a top view of a lighting pattern when the light source is switched on.

DESCRIPTION OF PREFERRED EMBODIMENTS

Figure 1:
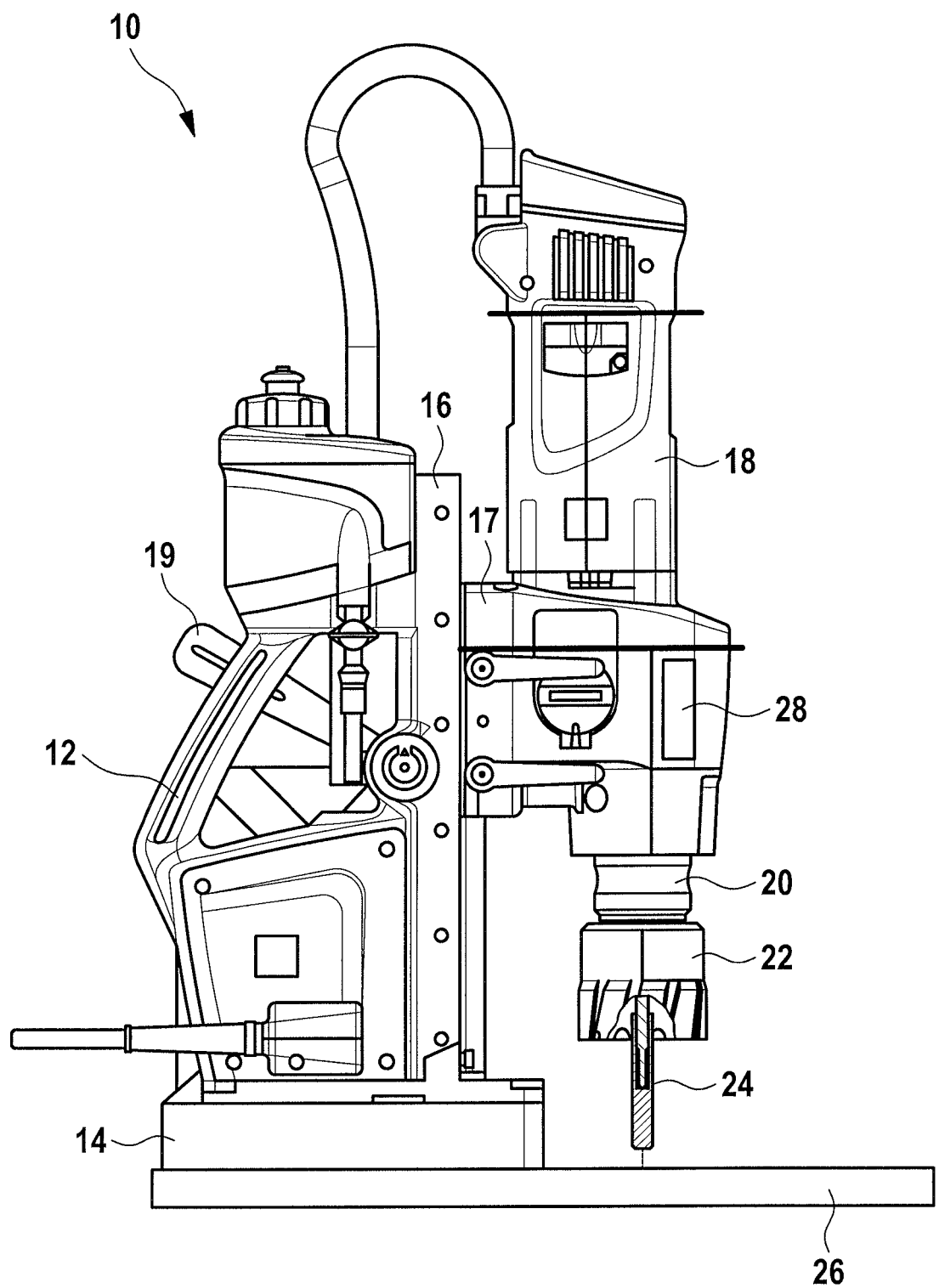
FIG. 1 shows a side view of a core drilling machine according to the invention with positioning aid.

FIG. 1 shows a core drilling machine 10 according to the invention comprising a positioning aid 24.

The core drilling machine 10 which is known fundamentally in the prior art has a stand 12 comprising a magnetic foot 14 for releasable fastening on a ferromagnetic workpiece 26. Provided on the stand 12 is a guide 16, along which runs a slide 17 on which a drilling unit 18 is held.

By actuation of a rotary cross feed 19, the drilling unit 18 can be manually repositioned along the guide 16 in the direction of the workpiece 26 in the course of the drilling, or an automatic feed can be used.

On the drilling unit 18 is provided a drill chuck 20, in which a drilling tool 22 for the core drilling machine can be clamped by means of a rapid-action fastening. For the release, i.e. for the removal of the drilling tool 22, the particular actuating ring of the drill chuck 20, in the representation according to FIG. 1, has merely to be pulled downwards, whereby the drilling tool 22 is freed and can be pulled out.

In addition, a positioning aid 24 for creating a light pattern can be fitted centrally into the drill chuck 20.

Figure 2:
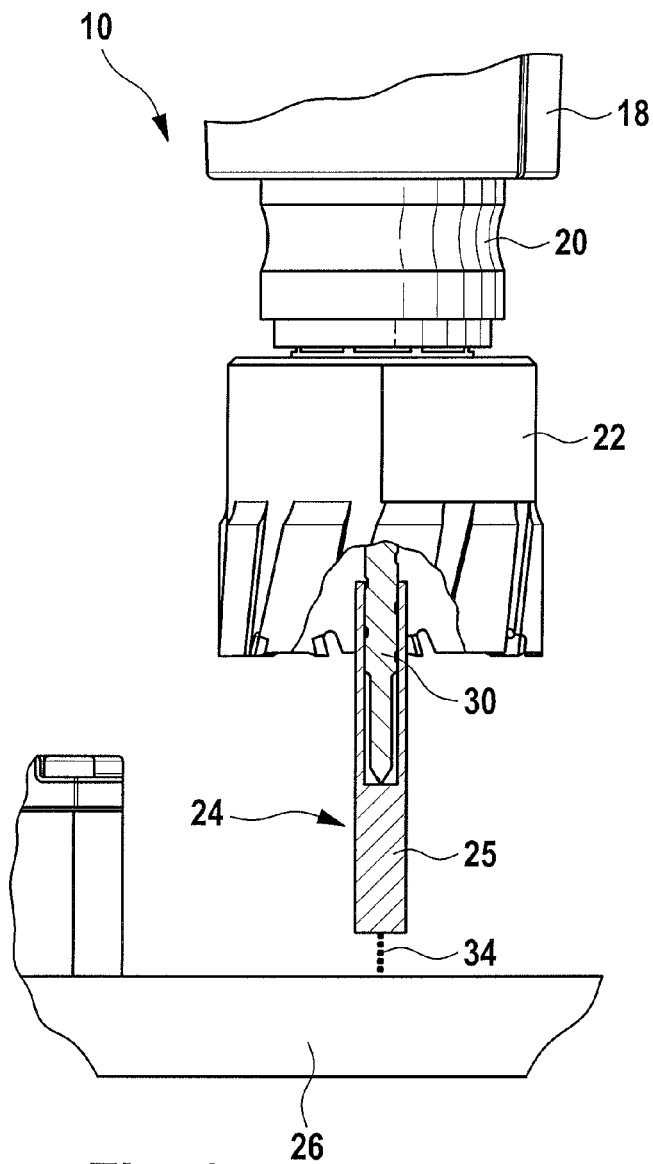
FIG. 2 shows an enlarged partial view of the core drilling machine in the region of the drill chuck with inserted core drill and additionally inserted positioning aid, which is represented partially in section.

As can be seen in greater detail from FIG. 2, the positioning aid, denoted in its entirety by 24, has a commercially available centring pin 30, which is insertable by its end releasably into the drill chuck 20 in a known manner. Onto the outer end of the centring pin 30 is mounted a light source 25 in the form of a laser pointer. The light source 25 is configured to create a centring pattern on the workpiece 26, as is indicated by the dotted line 34 in FIG. 2.

Figure 4:
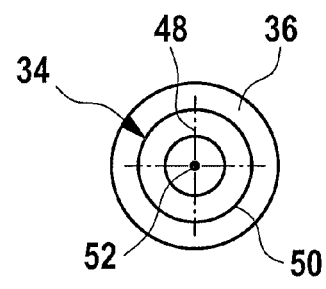

The centring pattern 34 created on the surface of the workpiece 26 is represented by way of example in FIG. 4 in top view. The centring pattern 34 can have a central laser point 52, a reticle 48 and/or one or more circles 50, in order to allow easy centring.

In addition, for the illumination of the work site, a light field 36 can be provided, which light field, in the positioning and centring, facilitates an accurate orientation, for instance in dark surroundings. The light field 36, which extends over a considerable area, preferably has a lower brightness than the centring pattern 34, which is formed significantly brighter.

Thus the core drilling machine 10, for centring with the support of the light field 36, can be displaced even in dark surroundings to the point where, if the centring pattern 34 is utilized, an exact positioning on the workpiece 26 is achieved.

Following the positioning of the core drilling machine 10, the positioning aid 24 is pulled off the centring pin 30, so that the drilling operation can be commenced. The centring pin 30 remains in the drill chuck 20 during the core drilling and serves as an ejector for the core created in the core hole drilling.

Figure 3:
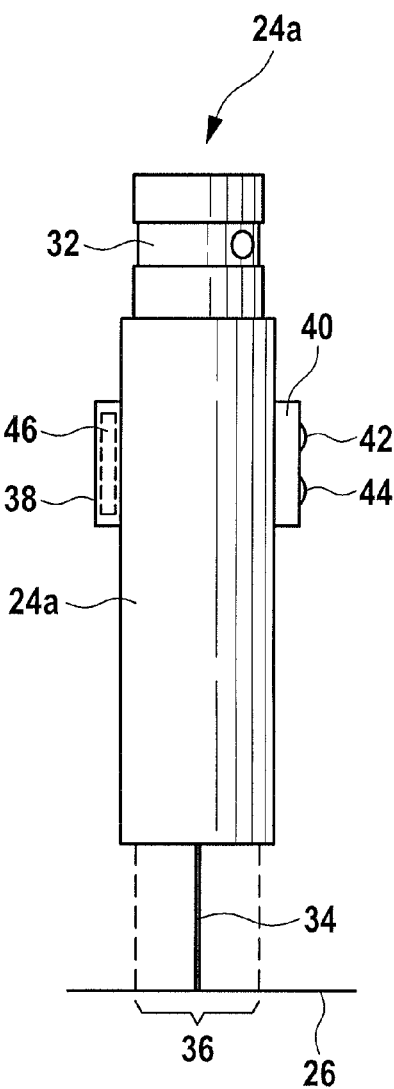
FIG. 3 shows a slightly modified embodiment of a positioning aid having at one end a receiving fixture which corresponds to the respective receiving fixture of a drill bit and thus allows a fastening in exchange for a drill bit.

FIG. 3 shows a modification of the positioning aid, which is denoted in its entirety by 24a.

A centring pin has here been dispensed with. Instead, the positioning aid 24a has at its machine end a receiving fixture 32, which corresponds to the drill bit holder of a drilling tool 22.

The positioning aid 24a can thus be inserted, in exchange for a drilling tool 22, into the drill chuck 20.

As a result, an increased precision in the centring of the positioning aid 24a on the core drilling machine 10 is obtained.

A certain drawback consists in the fact that the positioning aid cannot easily be pulled off the centring pin, but rather must be exchanged for the drilling tool 22.

In FIG. 2, on one side of the positioning aid 24 is further indicated a mounting 38, which serves to secure it to the core drilling machine 10 when it is not in use. The mounting can here be constituted, for example, merely by a plane surface made of a ferromagnetic material, which surface cooperates with an associated magnet on the core drilling machine 10.

In FIG. 1, such a magnet is denoted by way of example by 28.

Obviously, any other fastening types for securement to the core drilling machine 10 during non-usage are of course possible. Thus the magnet could also, for example, be configured on the mounting 38 of the positioning aid 24, or a pocket or some other suitable mounting, for instance with clip fastening, could, for example, be provided on the core drilling machine 10.

On the other side of the positioning aid 24a, opposite to the mounting 38, a switching device is denoted by 40, which switching device can be configured with one or two switches 42, 44, for instance in order to allow a joint switching of light field 36 and centring pattern 34, or a separate switching of light field 36 and centring pattern 34.

Furthermore, a battery, which can be constituted, for example, by a button cell, is denoted in dashed representation by 46.

At the lower end of the positioning aid 24*a*, the centring pattern in the form of a laser beam is denoted by 34, and the outer periphery of the light field 36, which serves to light the work site in adverse light conditions, is denoted by the two laterally dashed lines.

With the aid of the light field 36, the core drilling machine, during the positioning operation, can initially be positioned roughly in the region of the work site and then be precisely oriented with the aid of the centring pattern.

Following the positioning and definitive securement of the core drilling machine 10, the positioning aid 24*a* is pulled out by release of the drill chuck 20 and the drilling tool 22 subsequently inserted.

The invention claimed is:

1. A positioning aid for a core drilling machine having a drill chuck for receiving a core drill for creating a hollow-cylindrical drill hole, comprising a light source for creating a centring pattern on a workpiece, said light source comprising a housing having a recess being configured for centred attachment to an outer surface of a centring pin being adapted for attachment within said drill chuck of said core drilling machine, and a switch for switching said light source on and off, wherein said light source is configured for generating a light field for the lighting of a working area and a centring pattern for the centring, and wherein said switch is configured for separately switching said centring pattern and said light field.

2. The positioning aid of claim 1, wherein said light source comprises a laser pointer for creating said centring pattern.

3. The positioning aid of claim 1, wherein said light source is permanently connected to said centring pin.

4. The positioning aid of claim 3, wherein said recess is configured for releasably attaching onto said outer surface of said centring pin.

5. The positioning aid of claim 1, wherein said light source is configured to be automatically switched on when mounted onto said centring pin.

6. The positioning aid of claim 1, wherein said light source is configured for generating a light field for the lighting of a working area and a centring pattern for the centring.

7. The positioning aid of claim 6, wherein said centring pattern comprises a first illumination, and wherein said light field comprises a second illumination, said first illumination being brighter than said second illumination.

8. The positioning aid of claim 1, further comprising a fastening device for securing to said core drilling machine when not in use.

9. The positioning aid of claim 8, wherein said fastening device is configured as a magnet.

10. The positioning aid of claim 1, wherein said centring pattern comprises at least one element selected from the group consisting of a laser point, a reticle, and a circle.

11. A positioning aid for a core drilling machine with a core drill for creating a hollow-cylindrical drill hole, comprising a light source for creating a centring pattern on a workpiece, said light source being configured for releasable, centred fastening to a centring pin configured for attachment within a drill chuck of said core drilling machine, wherein said light source is configured for generating a light field for the lighting of a working area and a centring pattern for the centring, and wherein a switch is provided for separately switching said centring pattern and said light field.

12. The positioning aid of claim 11, wherein said light source is configured for generating a light field for the lighting of a working area and a centring pattern for the centring.

13. The positioning aid of claim 12, wherein said centring pattern comprises a first illumination, and wherein said light field comprises a second illumination, said first illumination being brighter than said second illumination.

14. A positioning aid for a core drilling machine with a core drill for creating a hollow-cylindrical drill hole, comprising:
a light source for creating a centring pattern on a workpiece, said light source comprising a housing having a recess being configured for centred attachment to an outer surface of a centring pin for said core drilling machine, and
a switch for switching said light source on and off,
wherein said light source is configured for generating a light field for the lighting of a working area and a centring pattern for the centring, and wherein said switch is configured for separately switching said centring pattern and said light field.

15. The positioning aid of claim 14, wherein said light source comprises a laser pointer for creating said centring pattern.

16. The positioning aid of claim 14, wherein said light source is permanently connected to said centring pin.

17. The positioning aid of claim 16, wherein said recess is configured for releasably attaching onto said outer surface of said centring pin.

18. The positioning aid of claim 14, wherein said light source is configured to be automatically switched on when mounted onto said centring pin.

19. The positioning aid of claim 14, wherein said light source is configured for generating a light field for the lighting of a working area and a centring pattern for the centring.

20. The positioning aid of claim 19, wherein said centring pattern comprises a first illumination, and wherein said light field comprises a second illumination, said first illumination being brighter than said second illumination.

21. The positioning aid of claim 14, further comprising a fastening device for securing to said core drilling machine when not in use.

22. The positioning aid of claim 21, wherein said fastening device is configured as a magnet.

23. The positioning aid of claim 14, wherein said centring pattern comprises at least one element selected from the group consisting of a laser point, a reticle, and a circle.

* * * * *